April 30, 1935.    G. M. PALMER    1,999,777
AIRCRAFT PICK-UP MECHANISM AND METHOD
Filed July 29, 1933
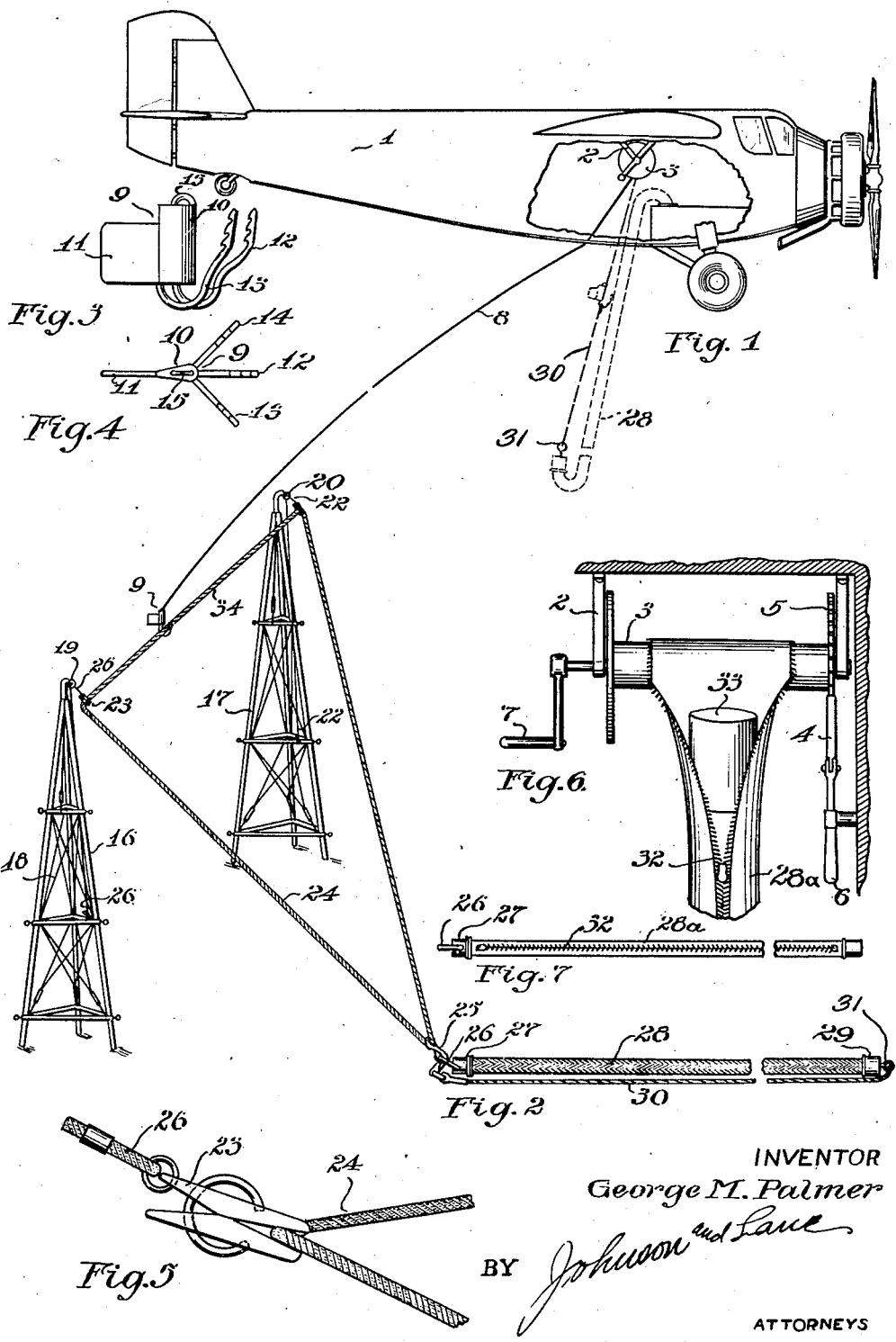
INVENTOR
George M. Palmer
BY Johnson and Lane
ATTORNEYS Patented Apr. 30, 1935

1,999,777

UNITED STATES PATENT OFFICE 1,999,777

AIRCRAFT PICK-UP MECHANISM AND METHOD

George M. Palmer, St. Paul, Minn.

Application July 29, 1933, Serial No. 682,848

3 Claims. (Cl. 258—1)

The present invention relates to a pick-up device for aircraft, and more particularly to an arrangement by which fuel and supplies may be picked up by an aircraft in flight, the load therefore of being assumed progressively by the aircraft to avoid shock and material retardation of the speed of the aircraft.

Various attempts have been made to construct an aerial pick-up mechanism for the above purpose, but in most of such devices the shock entailed by the sudden acquisition of the additional load at the moment of engagement has made such devices impractical except for use in picking up comparatively light objects.

An object of the present invention is to make an improved and simplified pick-up device.

In order to attain this object, there is provided, in accordance with one feature of the invention, an elongated flexible container laid on a supporting surface with the longitudinal axis of said container parallel to the proposed flight track of an aircraft to be used in picking up the container.

A member adapted to be engaged by the aircraft is provided on the end of the container from which the aircraft is intended to approach to pick up the container. Grappling means are mounted on the aircraft, together with suitable elevating means whereby the container, after being picked up, can be raised into the aircraft for disposition of its contents.

These and other features of the invention will be more fully brought out in the following description and the accompanying drawing, wherein:

Figure 1 is a view in side elevation of an airplane with grappling member lowered, a portion of a side of the cabin thereof being broken away to show a winch mechanism, a fuel container being discharged into a fuel tank being shown in dotted lines.

Figure 2 is a view in perspective of a container embodying the present invention as it would appear lying on the ground ready to be picked up by the aircraft shown in Figure 1, a central portion of the container being broken away for the purpose of enlarging the scale of the drawing, a pair of masts being shown supporting a loop of rope in position to be engaged by a grappling element of an airplane.

Figure 3 is an enlarged view in side elevation of a grappling hook adapted to be used in the present invention.

Figure 4 is a top view of the hook shown in Figure 3.

Figure 5 is an enlarged detail view of a snap fastener used to support the loop of rope shown in Figure 2.

Figure 6 is an enlarged view in front elevation of a modified form of a container adapted to contain bulk or packaged supplies; and Figure 7 is a top view of a container such as that shown in Figure 6 as it would appear when lying on the ground, as is the container in Figure 2, a central portion of the container being broken away.

Referring to the drawing in detail, an airplane 1 is of a conventional type, and is provided with a winch support 2 having a winch 3 rotatably mounted therein. A pawl 4 of a conventional type is mounted to engage a ratchet 5 formed on one side of the winch, the pawl 4 being operated by a handle 6 to permit an operator to move it into an engaging position with the ratchet 5 or to release it therefrom, as desired. A handle 7 is provided on the winch 3 to permit manual manipulation thereof. A cable 8 is wound on the winch 3, the lower end of the cable 8 having a grappling hook 9 secured thereto. This grappling hook 9 has a streamlined body portion 10 with a vane 11 extending rearwardly therefrom. Three hook-shaped members 12, 13, and 14 are mounted in the streamlined body portion 10 of the hook and extend radially outward and forward therefrom, as best shown in Figure 4. An eye 15 is provided in the upper end of the hook to facilitate connecting the cable 8 thereto.

A pair of masts 16 and 17 are preferably constructed of light tubing such as aluminum tubing, cross braced with wires 18 in a well known manner. Each of the masts 16 and 17 is provided with a pulley 19 and 20, respectively, around which are passed cords 21 and 22. An end of each of the cords is provided with a spring clip 23 (see Figure 5) which is adapted to resiliently grasp a loop of rope or cable 24. The opposite ends of the cords 21 and 22 extend downwardly alongside the masts in a position to be grasped by an operator to raise the clips 23 and with them the loop 24 to the position shown in Figure 2. A snap hook 25 is secured to the cord 24 and engages an eye ring 26 mounted on a threaded cap fitting 27 of a container 28. The container shown in Figure 2 is in the form of a liquid tight hose of the general type used by fire departments throughout the country. The opposite end of the hose or container 28 has an end fitting 29 thereon. The container shown in Figure 2 is of a type adapted to contain liquids such as gasoline and lubricating oils and preferably has an inner lining adapted to withstand the attacks of the liquids to be contained therein. This practice is well known to the art and it is believed unnecessary to recite the specific construction of the hose, since this is well known to the art.

A draw cord 30 is connected to the fitting 29 and by means of a releasable connection 31 to the eye ring 26.

A modified form of container 28—a is shown in Figures 6 and 7 and is provided with a slide fastener 32 of a conventional type mounted longitudinally of one side of the container so that by slidably moving the fastener the container may be split open lengthwise, as shown in Figure 6, thereby exposing the contents 33 thereof and facilitating their removal. The cable 8 and associated parts are not shown on the winch in Figure 6, but it is apparent that they would underlie the container if it were desired to wind the container over the winch 3 to facilitate the opening of the container and the removal of the contents thereof.

The operation of the device is as follows: The container 28 and associated parts are laid out, as shown in Figure 2, either on the ground or on a suitable supporting structure such as the roof of a building, if desired, and the loop 24 is engaged by the snap fasteners 23 which are then drawn upwardly to the position shown in Figure 2 to the tops of the masts 16 and 17, which places the loop 24 with a transverse portion 34 thereof disposed horizontally between the tops of the masts. It is preferable to have the end 29 of the container which is farthest from the masts at a lower elevation than the end 27 thereof, and it will be also desirable where convenient to have the end 29 of the container adjacent a sharp declivity, such as the edge of a cliff or the side wall of a building so that as the container is picked up by the aircraft it will not be necessary to climb the aircraft materially in order to have the container clear the ground.

The pilot flying the aircraft when approaching to pick up the container when positioned as illustrated, will fly toward the pick-up arrangement from left to right. The grappling hook 9 will be lowered sufficiently to clear the under carriage of the airplane by a sufficient margin to be determined by the pilot's own judgment, and it is preferable to have the cable 8 marked off as to lengths, which may be done, for instance, by painting five foot lengths of alternate red and white thereon, so that the pilot will know how far down his grappling hook hangs below the bottom of the fuselage.

The pilot then flies towards the device from left to right, as shown in the drawing, the device being preferably laid out so that the ship when approaching the device will fly into the wind. The pilot then flies at a good flying speed, preferably about normal cruising speed, or a little above, with his ship at an altitude so that the hook 9 will engage the transverse strand 34 of the rope 24. In the arrangement illustrated it will, of course, be necessary for the pilot to have an assistant to operate the winch and handle the equipment, and it is desirable for the assistant to have an opening in the floor of the plane so that he can watch the grappling hook 9, and he should immediately signal the pilot upon engagement of the hook 9 with the strand 34. At this instant the pilot should put his ship into a sharp climb for a distance equal to the combined length of the loop 24 when straightened out in parallel strands, as will be the case as soon as the loop 24 is put under strain in raising the container 28, plus the length of the container 28. The total combined lengths of the loop 24 and the container 28 will normally be about one hundred or one hundred and fifty feet, which, of course, is a very slight climb for an airplane and there will be no danger of materially reducing the speed of the plane even with the additional load imposed by the loaded container, since the weight of the container is not at once thrown onto the plane, but is gradually increased as the length of the container raised from the ground is increased. It is also apparent that there will be no material shock on the airplane since the load will be thus gradually increased until the entire container is raised from the ground. Where the container is placed with its free end 29 adjacent a sharp declivity, of a height equal to or greater than the combined lengths of the loop 24 and the container 28, it is apparent that it will be unnecessary to climb the airplane at all, since as soon as the entire container is raised from the ground it will swing over the edge of the declivity and will thus clear the ground beyond.

If the container 28 is loaded with gasoline or other liquid the upper end fitting 27 may be in the form of a threaded cap which may be unscrewed from the end of the tube when raised within reach of the operator in the airplane. The open end of the container 28 may then be inserted in the fuel tank opening, as shown in Figure 1, and the cord 30 may be used to draw the lower end 29 of the container upwardly and by winding this lower end of the container around the winch 3, to discharge the contents of the container into the fuel tank.

When using a container 28—a such as that shown in Figure 7 the container is picked up in the same manner as that shown in Figures 1 and 2, but with such a container it will be unnecessary to provide a cord such as the cord 30 to raise the lower end of the container, since the container may be opened and stripped of its contents, as shown in Figure 6. After the containers have been emptied of their contents they may be dropped from the aircraft in an open field or other area where there will be no danger of damaging property or injuring ground personnel.

Various modifications of the container and pick-up mechanism will be apparent to those versed in the art, and it is believed unnecessary to illustrate or describe such modifications in detail. The device provides a simple and effective means whereby containers of considerable weight can be picked up by an airplane in flight, the load being progressively assumed by the aircraft so as to avoid shock or material retardation of the speed of the aircraft.

I claim:

1. A pick-up mechanism comprising an elongated flexible container adapted to be laid on an elongated supporting surface, an engaging member secured to an end of said container and having a portion thereof disposed in a position to be engaged by an aircraft element moving toward the container from the direction toward which the end of said container carrying said engaging element is positioned to progressively raise said flexible container from the supporting surface, and means carried by an aircraft to engage said engaging member.

2. The method of picking up material by an aircraft which comprises packing the material in a flexible container, of disposing said container on a supporting surface, of securing an engaging member on an end of said container in a position to be engaged by an aircraft with an element adapted to engage said engaging member, and of flying said aircraft toward said container from the direction toward which the end having said engaging member is positioned to engage said engaging member to progressively lift said container from the surface upon which it is disposed.

3. The method of refueling aircraft while in flight, comprising seizing by grappling means attached to a cable suspended from such moving aircraft one end of an elongated flexible container while the same rests upon a support, and by continued flying movement with such grappling means so attached progressively raising said container from said support, and drawing upward to said aircraft said container by means of said cable.

GEORGE M. PALMER.